July 20, 1971 H. KIERNER 3,594,230
METHOD AND MACHINE FOR CLEANING SMALL PARTS
Filed April 25, 1969
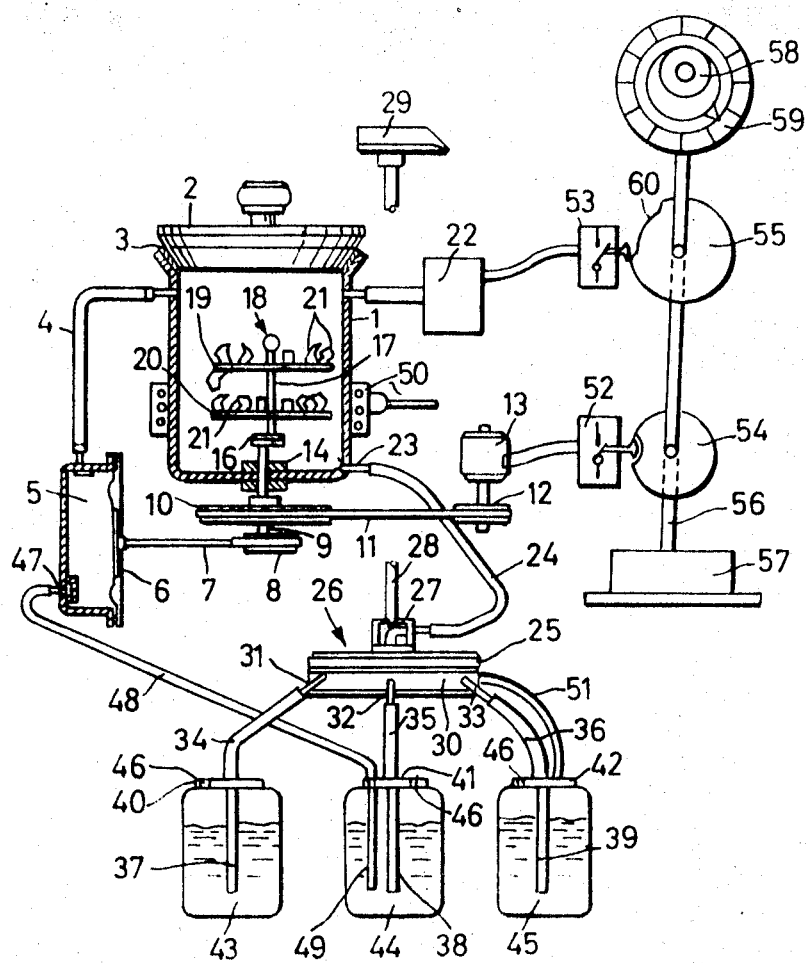
INVENTOR:
HANS KIERNER
By
Sherman Levy Attorney United States Patent Office 3,594,230
Patented July 20, 1971

3,594,230
METHOD AND MACHINE FOR CLEANING SMALL PARTS
Hans Kierner, Salzburg-Oesterreid Bajeenammerstrasse, Salzburg, Austria
Filed Apr. 25, 1969, Ser. No. 819,161
Claims priority, application Germany, Apr. 26, 1968, P 17 71 256.0
Int. Cl. B08b 3/00
U.S. Cl. 134—26            3 Claims

ABSTRACT OF THE DISCLOSURE

A method and means for cleaning small parts wherein there is utilized or provided pumps, control valves, rinsing liquid and a cleansing liquid, and a vacuum arrangement.

---

The invention relates to a method and a machine for the cleaning of fine mechanical small parts wherein the small parts to be cleaned in a cleaning vessel are moved successively in a cleaning liquid and in a rinsing liquid and the cleaning liquid and the rinsing liquid are supplied from their containers into the cleaning vessel successively by means of a pump.

In known apparatus of this kind there is provided between the cleaning vessel and the individual containers of the cleaning and rinsing liquids one or more liquid pumps which can be connected via one or more control valves to the suction pipes which terminate in the containers.

This known arrangement has the drawback that all cleaning and rinsing liquids are pumped through by means of the liquid pump so that due to the liquid residue remaining in the pump a mixing of the individual liquids takes place. As is known the quantities of residual liquid remaining in the pump are comparatively large so that after a small number of cleaning and rinsing operations the individual liquids are mixed with one another to such an extent that a satisfactory cleaning and rinsing procedure is no longer ensured and the individual liquids must be replaced. It has also been shown that in these liquid pumps dirt residues are readily deposited which lead additionally to a contamination of the individual liquids.

It is also known to move the parts by motor in holders or baskets inserted in the cleaning vessels such that they carry out regular straight or rotating movements so that not only does a chemical cleaning take place by means of the cleaning liquid concerned but in addition mechanical cleaning effects due to the relative movement between the parts to be cleaned and the liquid are attained. In particular with fine mechanical small parts having hollow spaces, or in which the cleaning of only partly or non-dismantled mechanisms of small watches is carried out these known cleaning machines fail because due to the regularity of the movements the cleaning liquid does not reach all places of the parts to be cleaned and also the cleaning cannot be carried out in the desired quantity.

For improving the cleaning action by means of suitable cleaning liquids it is also already known, after the filling of the cleaning liquids into the cleaning vessel to produce in the cleaning vessel a partial vacuum by pumping off and to subject the parts to be cleaned in the cleaning liquid to supersonic oscillations.

The problem on which the invention is based consists in providing a method and a machine for carrying out the method for the cleaning of fine mechanical small parts by means of which, on the one hand, it is ensured that the individual cleaning and rinsing liquids are mixed as little as possible so that these liquids can carry out as long and as satisfactorily as possible the tasks for which they are intended and on the other hand achieve improved cleaning actions in unfavorable places of the parts to be cleaned.

The method according to the invention is characterised in that the cleaning liquid and the rinsing liquid are drawn from their containers into the cleaning vessel one after the other by means of a vacuum produced in the cleaning vessel.

The machine for carrying out the method is characterised in that the cleaning vessel is connected at its upper area to a vacuum pump and is capable of being connected via one or more control valves individually to the containers of the cleaning and rising liquids respectively.

This arrangement ensures that the individual cleaning and rinsing liquids do not have to be conveyed by means of a pump, in which comparatively large quantities of residual liquids remain which can mix with the following liquid because the supply pump itself does not come into contact with the liquids.

For increasing the cleaning and rinsing action it is furthermore arranged that the vacuum pump works at least during the cleaning cycle and preferably also during the following centrifuging and rinsing cycles and produces and maintains a partial vacuum in the cleaning vessel. A further advantageous feature of the invention consists in that the conveying back of the cleaning and rinsing liquids respectively from the cleaning vessel into the containers associated therewith is controlled by means of an air inlet valve connected preferably in the upper area of the cleaning vessel which upon opening removes the partial vacuum present so that the liquid naturally located in the cleaning vessel can flow back by its own weight into the containers disposed thereunder. It is thus not necessary to effect a reversing or putting out of operation of the pump which has previously fed the liquid in question from its containers into the cleaning vessel or to allow the liquid located in the cleaning vessel to flow back via an additional pipe and an additional control valve into its containers. The liquid located in the cleaning vessel can flow back through the same pipe through which it has arrived into the cleaning vessel. Thus the possibility of a mixing of the liquid concerned with the other liquids is further reduced.

For producing and maintaining the partial vacuum in the cleaning vessel produced by the vacuum pump during the cleaning and during the rinsing operations it is expedient for the control valve or valves at least during the cleaning operation to be closed but also preferably during the rinsing cycle.

Although it would be possible without trouble even with an opened control valve, that is with an open connection between the containers concerned and the cleaning vessel to keep the liquid concerned in the cleaning vessel by means of continuous operation of the vacuum pump it is of advantage to bring the control valve during the individual working cycles into a closed position so that the connection between the cleaning vessel and the containers concerned is interrupted in order that dirt residue deposited on the floor of the cleaning vessel is not again drawn into the cleaning vessel.

For obtaining an increased and improved mechanical cleaning effect and rinsing effect by means of the cleaning and rinsing liquids it is furthermore arranged that the parts holder or basket carries out irregular movements during the cleaning and rinsing cycles in the actual liquid. For that purpose the further instruction of the invention is arranged such that the parts holder or basket is mounted in the cleaning vessel eccentrically on a shaft driven rotary by a motor rotatable freely on its axis. By this measure it is achieved that two movements of rotation are superimposed one of which has a regular drive and the other an irregular drive. The regular drive of one movement of rotation consists in that the axle of the parts holders or parts basket rotates on a circular path about the axis of the driving shaft, that parts to be cleaned being fixed however at different distances from the axis of the parts container or basket which parts according to the frictional resistance acting against them in the liquid concerned have additionally an irregular rotation of the parts container itself or of the parts basket around its axis. The parts to be cleaned located in the parts containers or parts basket therefore carry out an irregular rotation of the parts holder itself or of the part basket around its axis. The parts to be cleaned located in the parts holder or parts basket therefore carry out also in respect of the liquid surrounding it irregular elliptical movements. By means of this irregularity of the movement it is achieved that cleaning liquid also finds access to the most unfavorable places of the parts to be cleaned.

Further advantageous features of the invention are to be inferred from the following description, of an example as well as the sub-claims. In the drawing a diagrammatic construction of a machine for the carrying out of the method according to the invention is illustrated.

A cleaning container 1 is provided with a cover 2 which provided with a sealing ring 3 can close in an airtight manner the inner space of the cleaning container 1. In the appearance of the cleaning container 1 a suction pipe 4 is connected to a vacuum pump 5. The vacuum pump 5 is formed as a diaphragm pump 5 the diaphragm 6 of which is driven by a rod 7 from an eccentric 8. The eccentric 8 is fixed on a driving shaft 9 which is driven via a belt pulley 1 and belt 11 by means of a belt pulley 12 from an electric motor 13. The driving shaft 9 is rotatably mounted in a bush 14 in the floor 15 of the cleaning vessel 1 and carries at its upper end in the inner space of the cleaning vessel 1 an eccentric plate 16. On this eccentric plate 16 there is located freely rotatable the axle 17 of a parts holder 18. The bearing of the axle 17 of the parts holder 18 in the eccentric plate 16 is so arranged that the axle 17 is radially displaced in respect of the axis of rotation of the driving shaft 9 so that with the rotation of the driving shaft 9 and of the eccentric plate 15 firmly connected to this the axle 17 describes a circular path. The parts holder 18 has two discs 19 and 20 arranged one above the other on the axle 17 on which holding devices 21 for the fixing of the parts to be cleaned are disposed.

Likewise in the upper area of the cleaning vessel 1 an air inlet valve 22 is connected which is actuated preferably electromagnetically and is open in its position of rest.

On the floor of the cleaning vessel 1 there is located a tube connection 23 which is connected via a connecting pipe 24 to the adjustable head plate 25 of a control valve 26. The head plate 25 is provided via a coupling 27 with a control shaft 28 and a rotating button 29. The foot plate 30 of the control valve 26 has several connection tube members which are connectable individually each according to the angular position of the head plate 25 and of the connection pipe 24.

The individual connection tube members 31, 32 and 33 are connected via connecting pipes 34, 35 and 36 and immersion tubes 37, 38 and 39 fixed in the lids 40, 41 and 42 of containers 43, 44 and 45.

The lids 40, 41 and 42 are provided with air inlet openings 46.

For reducing the otherwise troublesome working noises of the vacuum pump 5 its out-let connection member 47 is connected via a connection pipe 48 to an immersion tube 49 which allows the compressed air produced by the vacuum pump 5 to emerge above the liquid level in the container 44. This emerging compressed air can then escape through the air inlet opening 46 of the cover 41.

For the drying of the cleaned and rinsed parts the cleaning vessel 1 is surrounded in known manner by a heating jacket 50. In order to lead off condensates resulting from the heating into the container 45 which contains rinsing liquid there is provided between the base plate 30 of the control valve 26 and the container 45 a further connecting pipe 51 which by means of suitable angular adjustment of the head plate 25 of the control valve 26 is connected in the connecting pipe 24.

The control of the driving motor 13 as well as of the air inlet valve 22 takes place by means of micro switches 52 and 53 which are actuated by cam discs 54 and 55. The cam discs 54 and 55 are driven by a common shaft 56 from a time switch mechanism 57 which is adjustable by a rotating knob 58 associated with a time scale 59.

The manner of operation of the cleaning mechanism just described is as follows:

After the insertion of the parts holder or basket 18 with the parts to be cleaned on the eccentric plate 16 and the closing of the cover 2 of the cleaning vessel 1 the driving motor 13 is switched on by corresponding rotation of the rotating knob 58 in a clockwise direction by a time pointer readable on the time scale 59 by means of the cam discs 54 and 55 and the two microswitches 52 and 53 on the one hand and on the other hand the air inlet valve 22 is closed. The head plate 25 of the control valve 26 is brought by suitable rotation of the knob 29 into the position in which the connecting pipe 24 is connected to the connecting tube connection member 31. Whether this switch procedure in the control valve 26 takes place before or after the actuation of the rotating knob 58, that is, therefore before or after the switching on of the driving motor 13 is in itself a matter of indifference. As soon as the driving motor 13 starts to run then by means of the rotation of the eccentric 8 on the driving shaft 9 the diaphragm 6 of the vacuum pump is set in motion so that it begins to build up a vacuum inside the cleaning vessel 1. Due to the partial vacuum thereby resulting the cleaning liquid via the connection pipes 34, the control valve 26 the connection pipe 24 which is located in the container 43 is then drawn into the cleaning vessel.

As soon as this suction procedure is terminated with a film of cleaning liquid or the floor of the container 43 which after lengthy use contains for the most part impurities, in the cleaning vessel 1 the head plate 25 of the control valve 26 is brought into a closed position in which none of the connecting pipes 34, 35, 36 and 51 are connected to the connection pipe 24 or to the cleaning vessel. As the vacuum pump 5 or its diaphragm is driven by the driving shaft 9 continues to operate also during the cleaning procedure the vacuum or the partial vacuum is continuously increased in the cleaning vessel so that the cleaning liquid which generally has a low boiling point is brought to boiling and thereby there is brought about a very good cleaning effect.

While the driving shaft 9 rotates, as already mentioned, the axle 17 in the cleaning liquid carries out a movement on a circular path around the axis of the shaft 9. Due to the frictional resistance which the holding devices and the parts to be cleaned produce in the liquid there takes place at the same time a movement of rotation of the axle 17 with the two discs 19 and 20 of the parts holder 18 so that, as already stated, two movements of rotation overlap one of which is regular and the other is continuously variable because of the frictional resistances continuously varying according to the provailing direction of movement. By means of this irregularly of the movement of the parts to be cleaned in the cleaning liquid in which also very irregular accelerations occur a very good mechanical frictional effect between the liquid and the parts to be cleaned and thus a very good mechanical cleaning effect is obtained in which the liquid reaches with certainty into even unfavorable place of the parts to be cleaned. In co-operation with the vacuum or partial vacuum prevailing in the cleaning vessel of these irregular cleaning movements a satisfactory cleaning is obtained in the shortest time so that the cleaning machine according to the invention ensures a substantially higher output and quality than cleaning machines hitherto known.

As soon as the time set on the time scale 50 by the rotating knob 58 has expired and the cam discs 54 and 55 have opened the microswitches 52 and 53 on the one hand the motor 13 is switched off and on the other hand the air inlet valve 22 is again opened so that after corresponding adjustment of the head plate 25 of the control valves 26 the cleaning liquid can flow back into the container 43 via the connecting pipe 24 the control valve 26 and the connecting pipe 34.

In this position of the control valve 26 a centrifugal operation is started which takes place in that by means of a limited movement of rotation of the rotating knob 52 is closed and the motor 13 is switched on while the microswitch 53 due to the notch 60 covering approximately an angle of 60 degrees remains open on the periphery of the cam disc 55.

Thus because the air inlet valve 22 remains open the pump 5 can build up no vacuum inside the cleaning vessel 1 so that the cleaning liquid of the container 43 which has already flowed back is not again lifted. If no liquid is present in the cleaning vessel 1 then due to the centrifugal forces which are effective on the parts on the parts holder 18 and on the parts themselves a rotation of the parts container 18 synchronous with the movement of rotation of the driving shaft 9 or of the eccentric plate 16 is attained because the braking effect which would previously be exercised on the discs 19 and 20 or on the parts fixed thereon upon the non-presence of the liquid fails and because generally the total centre of gravity of the discs 19 and 20 with the parts located thereon does not lie in the axis 17.

After termination of the centrifugal procedure the first rinsing procedure is initiated by adjustment of the head plate 25 of the control valve 26 the connection member 32 is connected in the connection pipe 24 and cleaning vessel 1 and by rotation of the rotating knob 58 in a clockwise direction the motor 13 is switched on and the air inlet valve 22 is closed. The same procedures as in the aforementioned cleaning operations are now repeated. After termination of the first rinsing operation, a centrifugal action can again be carried out in the same manner as previously described and then the last rinsing operation takes place through the control valve 26 with the connection connected to the container 45 of the last rinsing liquid.

After or during the last centrifugal action the heating means 50 can be switched on in known manner and by suitable adjustment of the head plate 25 of the control valve 26 the connection pipe 51 can be connected to the connection pipe 24.

Alternatively instead of a control valve 26 to be actuated by a rotating knob 29 several electromechanically controllable valves may be proided which, for example, are controllable by means of an automatic program control so that an adjustment by hand is no longer necessary. The control of such electromagnetically operable valves may, for example, be effected by a program cam disc which is driven by a time switch mechanism.

In order to allow the cleaning machine to work fully automatically and to make it capable of being switched on and off only by the actuation of a rotating knob it is only necessary for a suitable time switch mechanism 57 which at the same time effects the control of the valves, to take over the task of the control valves 26 as well as if the driving motor and of the air inlet valve 22 driven by an electric motor, for example, by means of a synchronous motor.

What we claim is:

1. A method for cleaning small mechanical parts comprising the steps of supporting said parts on a movable support within a closed cleaning container, rotating said support while simultaneously introducing into said cleaning container a low boiling point cleaning liquid from a separate source communicating with said cleaning container, said introducing step being carried out by applying a vacuum to said cleaning container so as to draw said cleaning liquid from said source into said cleaning container to thereby immerse said rotating parts in said cleaning liquid, interrupting communication between said cleaning container and said source while continuing to apply said vacuum to said cleaning container, maintaining said rotation of parts in the cleaning liquid and said vacuum for a predetermined cleaning period, said vacuum being continuously increased to bring said cleaning liquid to boiling during the cleaning period, after the cleaning period, conveying the cleaning liquid back to said source, then introducing into said cleaning container a rinsing liquid from another separate source while continuing to rotate said support, and after a predetermined rinsing period, conveying the rinsing liquid back to said another source, discontinuing said rotation and removing said parts from the cleaning container.

2. The method of claim 1 wherein vacuum is applied to said cleaning container during said rinsing period.

3. The method of claim 1 wherein said conveying steps are brought about by bringing said cleaning container into communication with the respective source and releasing the vacuum in said cleaning container, the respective liquid flowing back by gravity to its source.

References Cited

UNITED STATES PATENTS

| 1,983,931 | 12/1934 | Carter | 134—21UX |
| 2,277,508 | 3/1942 | Bingham | 134—140 |
| 2,650,179 | 8/1953 | Anderson | 134—21X |
| 2,877,611 | 3/1959 | Anrep | 134—21X |
| 3,294,101 | 12/1966 | Suzuki et al. | 134—104X |
| 3,420,712 | 1/1969 | Parsons | 134—33 |

MORRIS O. WOLK, Primary Examiner

J. T. ZATARGA, Assistant Examiner

U.S. Cl. X.R.

134—21, 25, 33